United States Patent [19]

Shitani

[11] Patent Number: 5,450,919
[45] Date of Patent: Sep. 19, 1995

[54] DIFFERENTIAL ACTION CONTROL SYSTEM OF A VEHICLE

[75] Inventor: Yuji Shitani, Hatsukaichi, Japan

[73] Assignee: Mazda Motor Corporation, Hiroshima, Japan

[21] Appl. No.: 180,398

[22] Filed: Jan. 11, 1994

[30] Foreign Application Priority Data

Jan. 12, 1993 [JP] Japan .................. 5-003171
Feb. 15, 1993 [JP] Japan .................. 5-025770

[51] Int. Cl.⁶ ............................................. B60R 17/34
[52] U.S. Cl. .................................... 180/233; 180/76; 180/197; 180/247; 180/248
[58] Field of Search ............... 180/233, 247, 248, 249, 180/197, 132, 76

[56] References Cited

U.S. PATENT DOCUMENTS

| | | | |
|---|---|---|---|
| 4,741,407 | 5/1988 | Torii et al. | 180/76 |
| 4,949,594 | 8/1990 | Galhotra | 180/233 |
| 4,953,654 | 9/1990 | Imaseki et al. | 180/233 |
| 4,966,249 | 10/1990 | Imaseki | 180/233 |
| 4,966,250 | 10/1990 | Imaseki | 180/233 |
| 5,103,690 | 4/1992 | MacPherson et al. | 180/233 |
| 5,119,900 | 6/1992 | Watanabe et al. | 180/247 |
| 5,332,059 | 7/1994 | Shirakawa et al. | 180/197 |

FOREIGN PATENT DOCUMENTS 62-166114 7/1987 Japan .

Primary Examiner—Mitchell J. Hill
Attorney, Agent, or Firm—Keck, Mahin & Cate

[57] ABSTRACT

A differential action control device of a vehicle includes an inter-axle differential disposed between axles for making a differential action between the axles, an inter-wheel differential disposed between wheels for making a differential action between the wheels, and a parameter setting device for detecting a vehicle running condition and setting a predetermined parameter based on the vehicle running condition detected. The device further includes target yaw rate setting device for setting a target yaw rate of the vehicle based on the parameter, a yaw rate detecting device for detecting an actual yaw rate of the vehicle while running, and a differential control device for controlling a differential action of the inter-axle and inter-wheel differentials based on a deviation between the actual and target yaw rate of the vehicle. The steering characteristic of the vehicle can be changed to get a desirable characteristic by making the differential action control.

8 Claims, 12 Drawing Sheets

DIFFERENTIAL ACTION CONTROL SYSTEM OF A VEHICLE

BACKGROUND OF THE INVENTION

1. Field of the Invention

The present invention relates to a differential action control system and, in particular, to a vehicle including respective differential mechanisms between both front and rear wheels and between a front axle and a rear axle.

2. Description of the Related Art

A so called four wheel drive vehicle is provided with a center differential mechanism disposed between a front drive axle and a rear drive axle as well as a front differential mechanism disposed between front wheels and a rear differential mechanism disposed between rear wheels. It is possible for the four wheel vehicle to provide a proper differential action to not only the front wheels and the rear wheels but also between the front axle and rear axle so as to eliminate so called a tight corner braking action by utilizing these differential mechanisms.

It should, however, be noted that it is difficult for the conventional four wheel vehicle to make a stable starting action or stable acceleration if one of the wheels of the vehicle starts racing. This is because the engine drive torque is hard to properly transmit to wheels other than the racing wheel. As a result, the driving stability, braking and accelerating characteristics are deteriorated.

In view of this, Japanese patent Public Disclosure No. 62-166114, laid open to the public in 1987, discloses a differential action control device for locking and unlocking the front, rear and/or center differential mechanisms in accordance with a driving condition of the vehicle by virtue of a hydraulic pressure control.

The differential action control device receives signals of wheel speed of the respective wheels and steering angle in the control circuit, judges whether the vehicle is running on a rough road, or making a straight running, accelerating action or braking action based on the signal and controls the front, rear and center differentials so as to improve the steering stability, braking characteristics and acceleration characteristics.

It should be noted that the conventional differential action control devices tend to make a locking of two or more differentials concurrently when a differential is to be locked. Thus, the amount of the torque transmitting to the wheels is abruptly changed to cause a so called torque shock. In the differential action control device as disclosed in the above Japanese Patent Public disclosure No. 62-166114, the differential action control is made in view of a specific running condition of the vehicle, such as acceleration, deceleration and the like. Consequently, this does not necessarily accomplish a smooth differential action control as a whole to satisfy the driver's feeling.

In addition, in the differential action control device as disclosed in the Japanese Patent Public Disclosure 62-166114, each of the differentials is controlled in accordance with various control parameters. However, it is desirable to detect the control conditions of the differentials with each other and control the respective differentials in view of an entire vehicle drivability. If each differential is controlled independently from the other, the active drivability, steering characteristics and driving stability may be deteriorated.

For instance, in a four wheel drive vehicle in which the driving force distribution ratio for the front and rear differentials is equal when the center differential is locked, and the driving force distribution for the front differential is reduced relative to that for the rear differential when the center differential is made free, an oversteer trend is enhanced if the driving force distribution is increased for the rear differential when a slip condition has occurred in the one of the rear wheels when the center differential is unlocked. The reason for that is as follows. Where the torque distribution ratio for the wheels are changed, the driving force transmitted from the each of the wheels to the road surface is also changed even though the engine output is not changed. It should, however, be understood that the capacity of the wheel, that is, the total amount of the driving force which can be transmitted from each of the wheels to the road surface, is substantially constant whether or not the direction of the force introduced into the wheel is varied (this phenomenon is commonly explained by using a friction circle). Consequently, if the distribution of the driving force for the rear wheels is increased, the grip force or resistance force of the rear wheels against a side force acting on the vehicle is reduced so as to tend to make the vehicle oversteer abruptly. It is desirable that the differential action control conditions for the respective differentials be detected or monitored to account for making a total control for the differential action of the vehicle.

SUMMARY OF THE INVENTION

It is therefore an object of the present invention to provide desirable steering characteristics of a vehicle by virtue of a differential action control throughout an entire running condition of the vehicle.

It is another object of the present invention to provide a differential action control through which safe driving characteristics of the vehicle can be maintained. It is a further object of the present invention to make the differential action control of the respective differentials based on the driving force distribution between the front and rear wheels accomplish a desirable running characteristics irrespective of the change of the driving force distribution between the front and rear wheels.

The above and other objects of the present invention can be accomplished by a differential action control device of a vehicle which comprises an inter-axle differential disposed between axles for making a differential action between the axles, an inter-wheel differential disposed between wheels for making a differential action between the wheels, parameter setting means for detecting a vehicle running condition and setting a predetermined parameter based on the vehicle running condition detected, target yaw rate setting means for setting a target yaw rate of the vehicle based on the parameter, yaw rate detecting means for detecting an actual yaw rate of the vehicle while running, differential control means for controlling a differential action of the inter-axle and interwheel differentials based on the deviation between the actual and target yaw rate of the vehicle.

In the preferred embodiment, the differential control means increases a differential restriction force for restricting the differential action of the inter-axle differential compared with the inter-wheel differential when the target yaw rate is smaller than the actual yaw rate.

In another aspect of the present invention, the inter-wheel differential includes a front differential disposed between front wheels and a rear differential disposed between rear wheels. The differential control means increases the differential restriction force of the rear differential compared with the other differentials when the target yaw rate is greater than the actual yaw rate.

In another preferred embodiment, the differential control means increases the differential restriction force of the inter-axle differential compared with the front and rear differentials when the target yaw rate is smaller than the actual yaw rate. It is desirable that the differential control means increases the differential restriction force of the rear differential compared with the front differential and increases the differential restriction force of the inter-axle differential compared with front differential when the target yaw rate is greater than the actual yaw rate. Thus, an understeer tendency of the vehicle can be compensated. In addition, the differential control means stops controlling the differential action to prevent the differential restriction force from changing when the actual yaw rate is far greater than the target yaw rate.

In another preferred embodiment, the differential control means reduces the differential restriction force of the front differential when the actual yaw rate is far greater than the target yaw rate.

According to the present invention, the running condition of the vehicle is detected to set a target yaw rate in accordance with the running condition and to make the differential action control in a manner such that the target yaw rate is converged to the actual yaw rate. The target yaw rate is determined based on predetermined characteristics of the target yaw rate which are preset in connection with a steering angle of the vehicle. Thus, if the steering angle is detected, the target yaw rate is properly given in light of the predetermined relationship to the steering angle. Generally, where the differential action is restricted for the interaxle differential, the driving force distribution between the front wheels and rear wheels are equalized so that the vehicle tends to take a straight path. In another aspect, this means that the vehicle is controlled to have an understeer tendency in a corner drive.

In contrast with the foregoing, where the differential action of the inter-wheel differential is restricted, the driving forces transmitted to the right and left wheels are equalized to thereby give the vehicle a tendency of straight running. If the inter-axle differential is allowed to make the differential action in the case where the vehicle is in a constant corner drive action, the differential action between the front wheels and rear wheels is allowed to eliminate the tight corner braking. In this case, the steering characteristics is controlled to be an oversteer tendency to reduce the minimum cornering radius of the vehicle. The rear differential is controlled to restrict the differential action between the right and left rear wheels and the outer rear wheel in the cornering action is subjected to a braking torque by the rear differential. Consequently, the grip force of the wheel is greatly exerted to the braking force compared with the side force. This makes the outer wheel of the rear wheels in the cornering action less resistant against the side force. Thus, the steering characteristics of the vehicle is controlled to be an oversteer tendency.

According to the present invention, the differential action control device sets the target yaw rate of the vehicle based on a parameter and controls the differential action between inter-axles and inter-wheels based on the actual yaw rate and the target yaw rate. Thus, the steering characteristics of the vehicle can be controlled to be changed through the differential action control to get desirable steering characteristics.

For instance, if the actual yaw rate is greater than the target yaw rate, or if the steering characteristic has a oversteer tendency, the differential action of the inter-axle differential is restricted compared with that of the inter-wheel differential. Consequently, as mentioned above, the driving force distribution between the front wheels and rear wheels is equalized, that is, the differential action between the front wheels and the rear wheels is restricted. As a result, the tight cornering action is suppressed to compensate the steering characteristics of the vehicle toward an understeer tendency. Particularly, in the vehicle which is provided with both the front and rear differentials, if the actual yaw rate is smaller than the target yaw rate, in other words, if the vehicle has understeer characteristics, the restriction force of the differential action of the rear differential is increased compared with the other differentials. Where the actual yaw rate is greater than the target yaw rate, in other words, if the vehicle is in an oversteer characteristics, the restriction of the differential action for the inter-axle differential is increased compared with those of the front and rear differentials and an excessive oversteer tendency of the vehicle can be effectively suppressed.

Alternatively, if the actual yaw rate is smaller than the target yaw rate, the restriction force of the differential action for the rear differential is increased compared with the front differential and if the restriction force of the differential action for the inter-axle differential is increased compared with the front differential, the vehicle is efficiently led to the understeer tendency.

If the actual yaw rate is far greater than the target yaw rate, the restriction force control for the differential action is stopped to prevent the change of the differential action. Thus, even if the vehicle is in an emergency condition, the steering characteristics of the vehicle is kept unchanged. This enables the driver to keep the operation of the vehicle stable and to keep the vehicle's safety. In another embodiment, if the actual yaw rate is far greater than the target yaw rate, the restriction force for the differential action of the front differential is reduced so that the operability of the front wheels are improved. Thus, the driver can take a quick response in steering vehicle when the vehicle is in an urgent condition.

In another aspect of the present invention, the differential action control device of a vehicle comprises distribution device disposed between axles for distributing the driving force between the front and rear wheels, parameter setting means for detecting a running condition of the vehicle and setting a predetermined parameter based on the running condition, differential control means for controlling a differential restriction force of an inter-wheel differential and restriction force change means for changing the differential restriction force in accordance with a distribution ratio between the front and rear wheels determined by the distribution device.

Preferably, when the torque distribution ratio of one of the front and rear differentials is increased, the change means reduces the restriction force of the differential action for the one of the differential. Where the differential action between the right and left wheels is allowed, the steering characteristic of the vehicle is not changed abruptly in a steered condition, such as in a corner drive or curved path. Thus, the steering stability can be improved. Where the distribution ratio for the rear wheels is increased, the vehicle tends to have an oversteer characteristic. On the contrary, where the distribution ratio for the front wheels is increased, the understeer characteristic is enhanced.

In another preferred embodiment, as the driving force distribution ratio of either one of the front wheels and rear wheels is increased, the change means increases the restriction force for the one of the inter-wheel differentials. For example, if the distribution ratio of the front wheels is increased, the change means increases the restriction force of the differential action of the front differential. On the other hand, if the distribution ratio of the rear wheels is increased, the change means increases the restriction force of the differential action of the rear differential. In those conditions, where the differential action between the right and left wheels in which the torque distribution is increased is restricted, a driving activity can be improved when the vehicle is driven without substantial steered condition on a slippery road or low friction road. For example, as the driving force distribution of the rear wheels is enhanced, the rear wheels tend to produce a slip. In this condition, such slip condition can be suppressed by restricting the differential action of the rear differential.

Alternatively, the change means may increase the restriction force of the differential action of the inter-wheel differential for which the driving torque distribution is not increased as the torque distribution ratio between the front wheels and rear wheels is changed. The driving stability for the straight running can be improved through the control in which the differential action is restricted in the inter-wheel differential for which the driving torque distribution is reduced. This can be explained as follows. If the torque distribution is reduced for a wheel, the wheel gets an increased grip force against the side force as aforementioned. Thus, even if the vehicle body is subjected to an external disturbance, such as a side wind, the vehicle can suppress the side slip. In addition, the differential action of the wheel is restricted through the above differential action control. As a synergistic effect thereof, the driving stability of the vehicle can be improved when it runs on a straight path.

In another aspect of the present invention, the restriction force of the differential for which the torque distribution is not increased may be reduced as the torque distribution ratio between the front wheels and rear wheels is changed. A turning performance of the vehicle can be improved by allowing the differential action between the right and left wheels for which the torque distribution are not increased. This reason can be explained as follows. A wheel increases the grip force against the side force when the torque distribution is reduced therefor. However, if the differential action for the wheels is restricted, the grip force against the side force is reduced. As a result, the turning performance of the vehicle would be deteriorated. In order to avoid the above situation, the present invention allows, at least in the turning condition of the vehicle, the differential action of the differential for which the torque distribution is not increased. The difference of a rotation speed between the right and left wheels can be utilized as the above mentioned parameter.

Preferably, the distribution ratio of the driving force can be changed between 40:60 to 50:50 through the restriction force control of the center differential which is typically embodied by a planetary gear mechanism and shares the driving force between axles for the front and rear wheels.

Further objects, features and advantages of the present invention will become apparent from the Detailed Description of Preferred Embodiments which follows when read in light of the accompanying Figures.

BRIEF DESCRIPTION OF THE DRAWINGS

FIG. 20 is a graphical representation between a relationship between the differential rotation speed of the rear differential and the restriction force for directing an active drive;

DETAILED DESCRIPTION OF THE PREFERRED EMBODIMENTS

Figure 1:
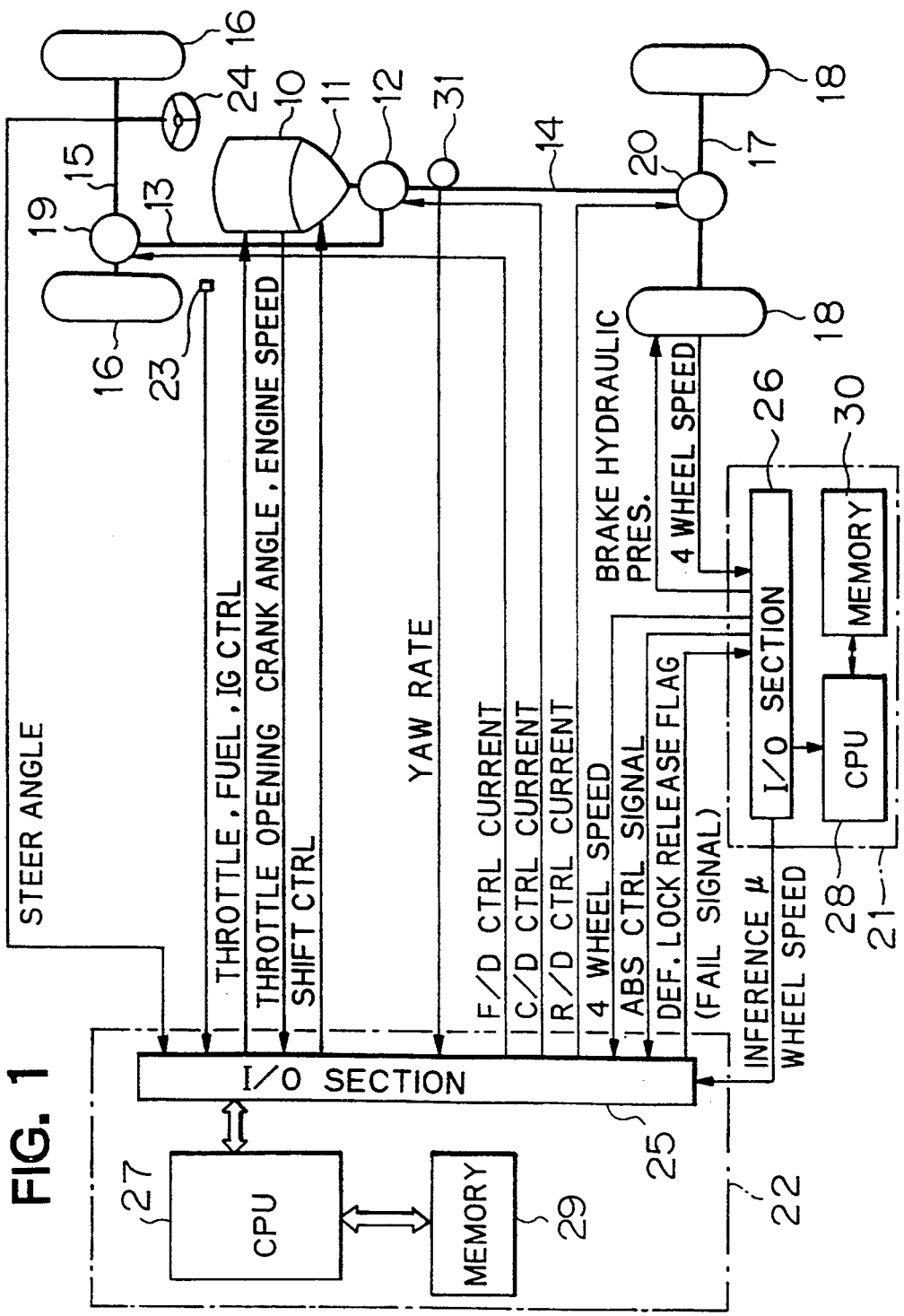
FIG. 1 is a schematic view of a vehicle control system with a differential action control system in accordance with the present invention.

Referring to FIG. 1, there is shown a schematic view of a control system of a vehicle. First, a power transmitting system of the vehicle will be explained.

The vehicle is provided with an engine 10 with which a transmission 11 is operably joined. A center differential 12 is disposed at the output side of the transmission 11. With the center differential is connected a front propeller shaft 13 from which the output torque of the engine 10 is transmitted to front wheels and a rear propeller shaft from which the engine output torque is transmitted to rear wheels. The front propeller shaft 13 is connected with the front wheels 16 through front axles 15 respectively. The rear propeller shaft 14 is connected with the rear wheels 18 through rear axles 17. A front differential 19 is provided on the front axle 15 and a rear differential 20 is provided on the rear axle 17. The illustrated vehicle is provided with an Anti-Skid Braking System (ABS) and ABS control unit 21 therefor. In addition, the vehicle is provided with a power train control unit 22 for controlling the transmission 11 and the engine 10.

The control units 21 and 22 receive signals which denote various running condition of the vehicle. The respective front wheels 16 and rear wheels 18 are provided with wheel speed sensors 23, one of which is shown schematically, for detecting rotation speeds of the wheels. Signals from the wheel speed sensors are introduced to the ABS control unit 21. Further, a brake switch is provided for detecting whether or not a brake of the vehicle is operated and producing a signal therefor. A throttle sensor in the engine intake system is provided for detecting a throttle opening of a throttle valve.

The control unit 22 receives the throttle opening from the throttle sensor, a yaw rate of the running vehicle from a yaw rate sensor 31, engine rotation speed from an engine speed sensor, steering angle of steering wheels 24 from a steering angle sensor and the like. The yaw rate can be detected by means of a gyro type sensor or utilizing another way. For example, a pair of side gravity sensors for sensing a side force acting of the vehicle body are disposed in a longitudinally spaced relationship opposite sides of the gravity center of the vehicle body. The difference between the indications of the two sensors can be employed as the yaw of the vehicle. Alternatively, the yaw can be detected based on a speed difference between the wheel speed of the right and left wheels.

The control unit 22 produces a throttle opening signal to control the throttle opening of the engine 10 and produces a fuel injection signal to control a fuel injector. Further, the control unit 22 produces an ignition signal to control an ignition timing. In addition, the control unit 22 produces a shift signal to the transmission 11 to control the shift control. The control unit is connected with the ABS control unit 21 through which the control unit 22 receives a friction coefficient $\mu$ inferred and the wheel speeds of the respective wheels. Meanwhile, the control unit 22 produces a fail signal and unlocks the differential lock condition when the vehicle is in an urgent condition, if necessary.

The control units 21 and 22 are provided with input and output sections 25 and 26 including input and output interfaces, CPU 27, 28 for processing various signals and memories 29, 30 for storing programs and data respectively. All the input and output signals are transmitted through the input and output sections 25 and 26. In the differential action control, the control unit 22 produces control current signals for controlling the differential action of the center differential 12, the front differential 19 and the rear differential 20. Based on the values of the control current, the center, front and rear differentials 12, 19 and 20 take unlock, intermediate lock and entire lock conditions respectively. In the unlock condition, the differential action is fully allowed. On the contrary, the differential action is prohibited under the lock condition. In the intermediate condition, the current value is controlled to change a restriction force of the differential action of a differential and thereby to change a distribution ratio of the driving force. If there is no differential action of a differential, the distribution ratio is 50:50. In the illustrated embodiment, the center differential changes the distribution ratio of the driving force of the front propeller shaft 13 to that of the rear propeller shaft 14 in a range from 50:50 to 40:60. The distribution ratio or distributed engine torque can be changed continuously by changing the control current for magnetic clutch 50.

Figure 2:
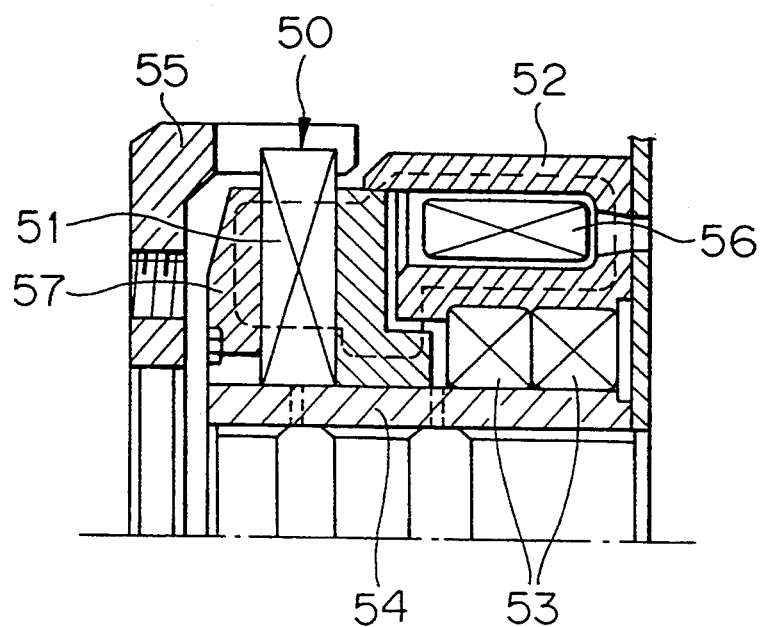
FIG. 2 is a sectional view of a magnetic clutch of multiple plate provided in a center differential.

FIG. 2 shows a sectional view of the magnetic clutch 50 of multiple friction plates in accordance with the preferred embodiment of the present invention. The magnetic clutch 50 is provided on the center, front and rear differentials 12, 19 and 20 respectively. The respective differentials 12, 19 and 20 can be controlled to change the differential effect continuously by means of controls of the currents for the magnetic clutches 50 from the lock condition to the unlock condition. Any magnetic clutch can be employed for controlling the differential action as far as it can restrict the differential action between the front and rear propeller shafts 13 and 14. In FIG. 2, the magnetic clutch 50 is provided with a plurality sets of clutch plates 51 having inner plates and outer plates 57 and an actuator 52 producing an urging pressure to the clutch plates 51. A power transmitting member 54 is provided on the clutch 50 for transmitting the driving force to one of drive mechanisms, such as the front and rear propeller shafts. Another transmitting member 55 is provided on the clutch 50 for transmitting the driving force to another drive mechanism. The numeral 53 designates a bearing member for rotatably carrying the actuator 52 on the transmitting member 54. The actuator 52 urges the clutch plate 51 when a solenoid thereof is magnetically enacted. In the magnetic clutch 50, as the current value introduced to the solenoid 50 is increased, the frictional force produced in the multiple frictional plates 51 is increased. In other words, the urging pressure of the clutch 50 is increased as the electric current introduced into the solenoid 56 is increased. Thus, the differential action of the center, front and rear differentials 12, 19 and 20 can be controlled continuously by controlling the electric current introduced to the solenoid of the clutch.

Figure 3:
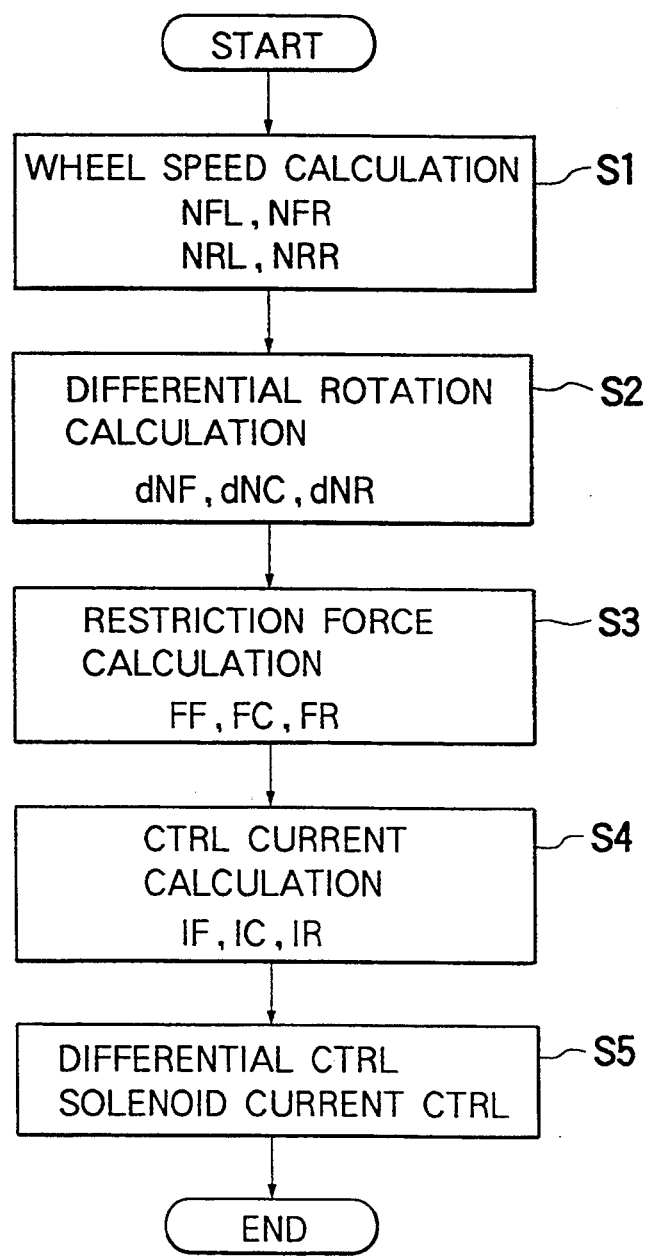
FIG. 3 is a flow chart of a main routine of the differential action control.
Figure 4:
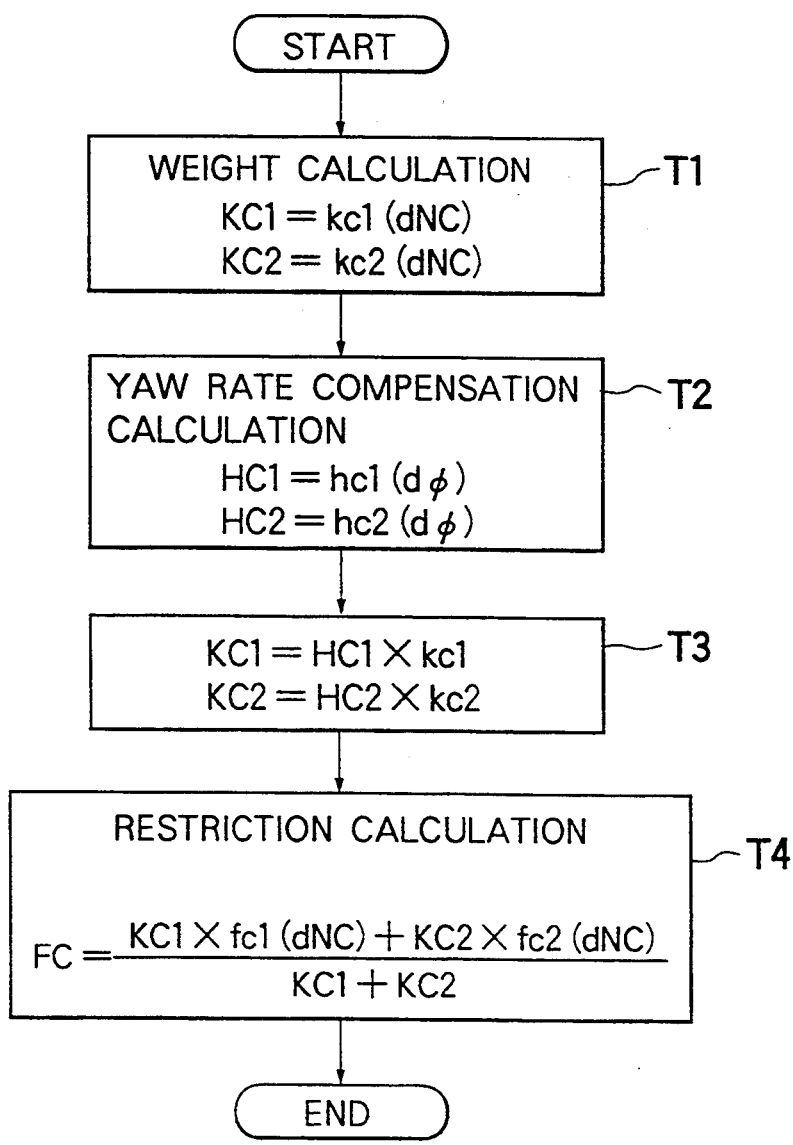
FIG. 4 is a flow chart of a routine for calculating the restriction force of the differential action.
Figure 5:
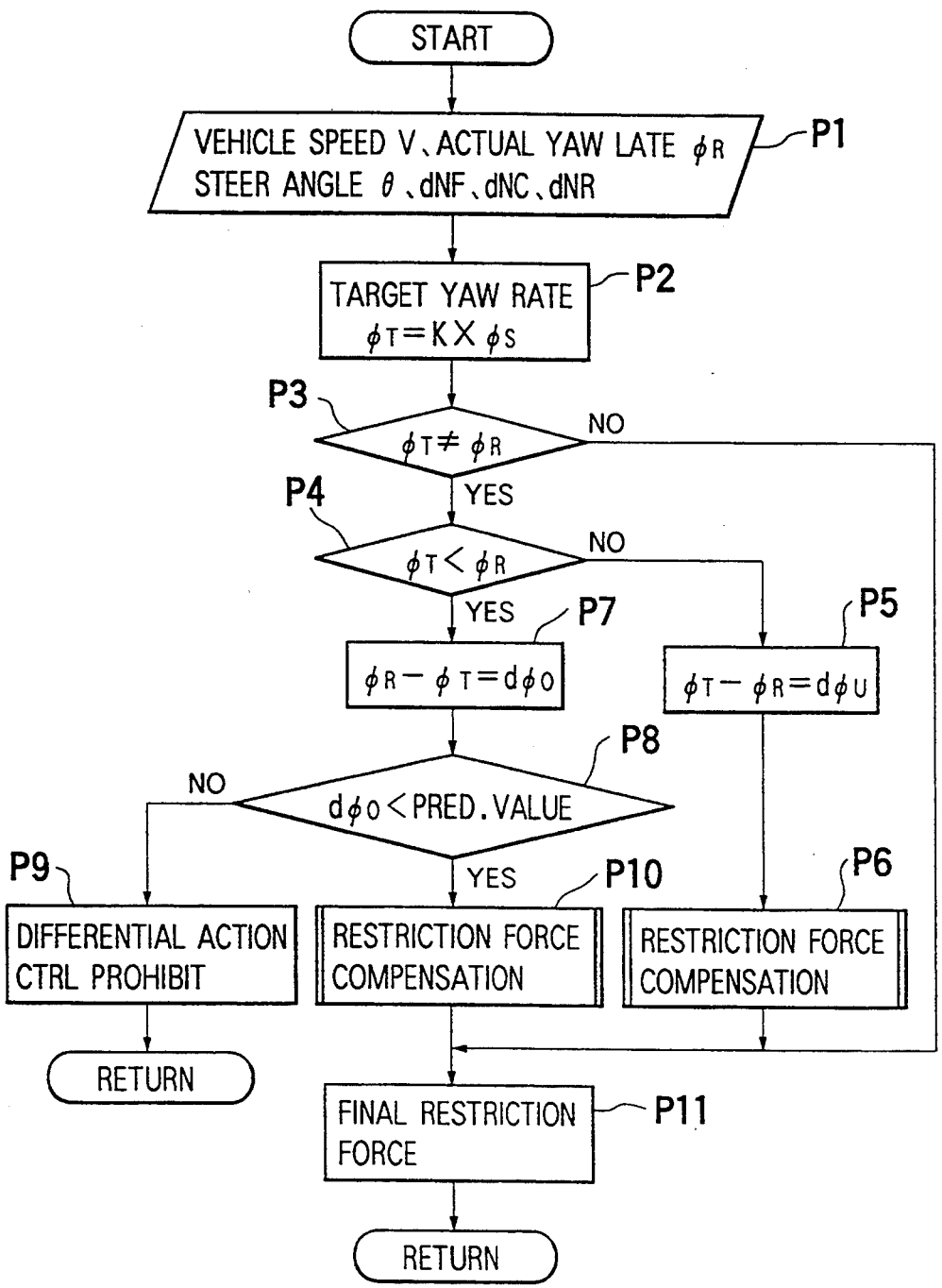
FIG. 5 is a flow chart of a routine for compensating the restriction force of the differential action based on a deviation of a yaw rate to determine a final restriction force of the differential action.

FIGS. 3, 4 and 5 shows flow charts of the differential action control for the differentials 12, 19 and 20 in accordance with the present invention.

FIG. 3 shows a main routine of the differential action control. The control unit 22 calculates the wheel speeds of the respective wheels (right front wheel speed NFR, left front wheel speed NFL, right rear wheel speed NRR, left rear wheel speed NRL) (step S1). Next, the control unit 22 calculates the differential rotation dNF, dNC and dNR of the center, front and rear differentials 12, 19 and 20 (step S2).

Figure 6:
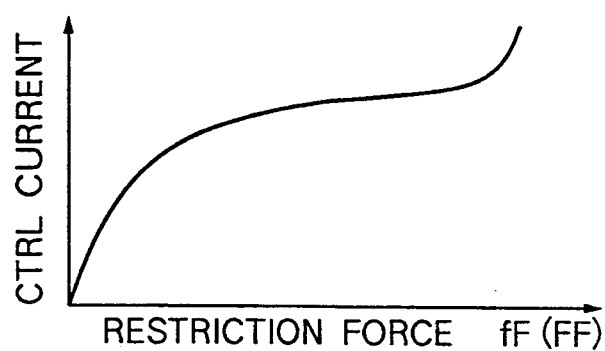
FIG. 6 is a graphical representation showing a relationship between the restriction force and the control current for a solenoid for controlling the clutch.

Next, the control unit 22 calculates a lock force or restriction forces FF, FC and FR of the differential action for the respective differentials 12, 19 and 20 by executing routines shown by the flow chart in FIG. 4 (step S3). When the restriction forces FF, FC and FR are determined, the control unit 22 determines the control currents IF, IC and IF for the solenoids of the clutches 50 of the front, center and rear differentials 19, 12 and 20 (step S4). In this case, the currents IF, IC and IR can be expressed as functions of the restriction forces FF, FC and FR. Thus, IF=f(FF), IC=f(FC) and IR=f(FR). Accordingly, if predetermined functions can be provided for expressing the relationship between the control currents and restriction forces, the control currents can be obtained from the values of the restriction forces to be accomplished. Alternatively, a characteristic of the control current can be provided by a map as shown by FIG. 6 in which the control current of the front differential is provided in relation with the restriction force of the differential action.

The control unit 22 gets the restriction forces FF, FC and FR by providing the solenoids 56 with the control currents values for the solenoids 56 obtained through the above procedures.

Taking reference with FIG. 4, there will be described a procedure for obtaining the restriction forces FF, FC and FR, which corresponds to the step S3 in FIG. 3.

This procedure can be commonly applied for the respective differentials 12, 19 and 20 so that the description is made only for the center differential but the description can be applicably to the other differentials, that is, the front and rear differentials 19 and 20.

Figure 7:
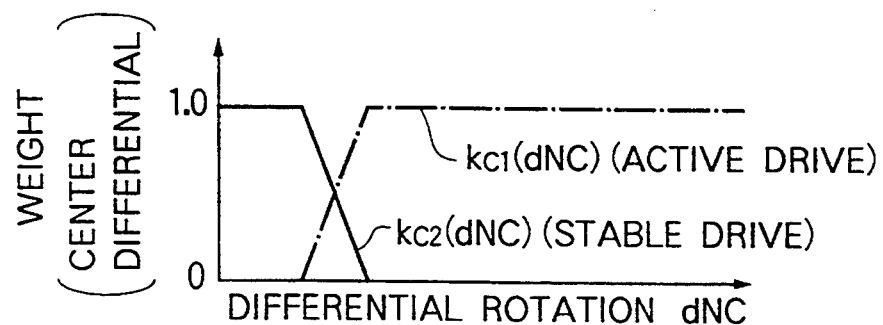
FIG. 7 is a graphical representation showing a relationship between a differential rotation speed of the center differential and a weight coefficient of the restriction force.

The control unit 22 calculates a weight KC1=kc1(dNC) based on a weight function kc1(dNC) for improving an active drivability in which the vehicle can get a greater operability specifically in a turning action and based on a weight function kc2(dNC) for improving a driving stability (step T1). The value of the weight is changed from 0.0 to 1.0 as shown in FIG. 7 as the differential rotation dNC of the center differential 12 is changed. In FIG. 7, as the differential rotation speed dNC is increased beyond a predetermined value, the value of the weight function kc1(dNC) is changed from 0 to 1. On the contrary, the weight kc2(dNC) takes a value of about 1 when the differential rotation dNC is less than a predetermined value. Then, the value of the weight function kc2(dNC) is changed from about 1 to 0 as shown in FIG. 7. The value of the weight function is set based on the following. That is, where the restriction force FC is reduced, the active drivability can be improved. On the other hand, where the restriction force FC is increased for restricting the differential action, the driving stability is improved.

Figure 8:
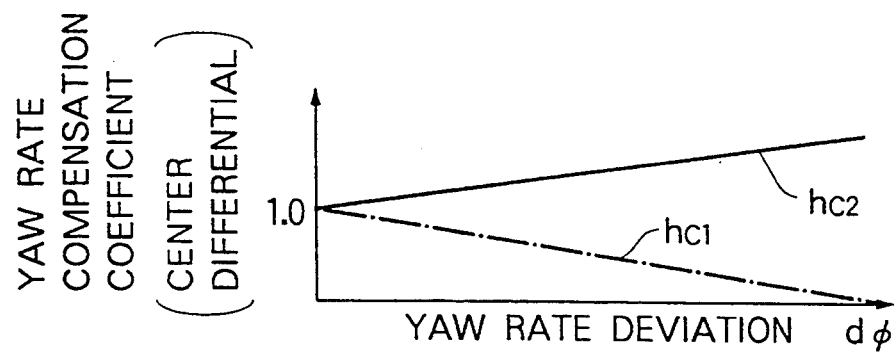
FIG. 8 is a graphical representation of a relationship between the deviation of the yaw rate in the center differential and the compensation coefficient of the restriction force based on the deviation of the yaw rate.

Next, the control unit 22 determines compensations HC1, HC2 for compensating the restriction force FC based on the yaw rate of the vehicle body (step T2). The compensations HC1 and HC2 are determined based on a compensation function hc1(d$\phi$) which weighs on the active drivability and a compensation function hc2(d$\phi$) which weighs on the driving stability. Thus, the respective yaw rate compensation functions can be expressed by the following formulas. HC1=hc1(d$\phi$) and HC2=hc2(d$\phi$). The yaw rate compensation functions hc1(d$\phi$) and hc2(d$\phi$) are provided as shown by FIG. 8 in the illustrated embodiment. As a difference d$\phi$ between a target yaw rate $\phi_t$ and an actual yaw rate $\phi_R$ is increased, the value of the compensation function hc1(d$\phi$) for weighing on the active drivability is gradually decreased from a value of 1. On the other hand, the value of the compensation function hc2(d$\phi$) for weighing on the driving stability is gradually increased from a value of 1. In order to weigh on the driving stability, the restriction force FC is increased to control the actual yaw rate $\phi_R$ to the target yaw rate $\phi_R$ as quickly as possible. As opposed to that, in improving the driving stability, the restriction force FC is decreased to improve the turning characteristic of the vehicle.

Next, the control unit 22 renews the values of the weight KC1 and KC2 (step T3) taking account of the compensations HC1 and HC2. The restriction force FC of the differential action is provided based on a function of the differential rotation dNC. For this purpose, there are provided a control function fc1(dNC) for weighing on the active drivability and a control function fc2(dNC) for weighing on the driving stability. The values of the restriction force FC is calculated based on the values of the functions fc1 and fc2 by taking account of the weight KC1 and KC2. That is, the restriction force FC is provided as follows;

FC={KC1*fc1(dNC)+KC2*fc2(dNC)}/(KC1+KC2) (step T4).

Figure 9:
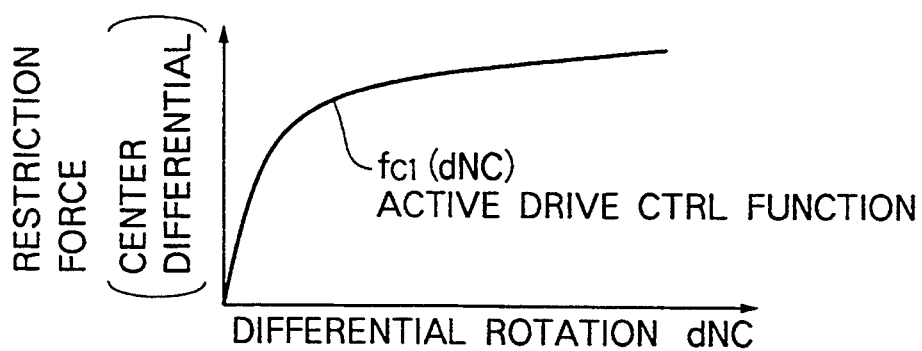
FIG. 9 is a graphical representation between a relationship between the differential rotation speed of the center differential and the restriction force for directing an active drive.
Figure 10:
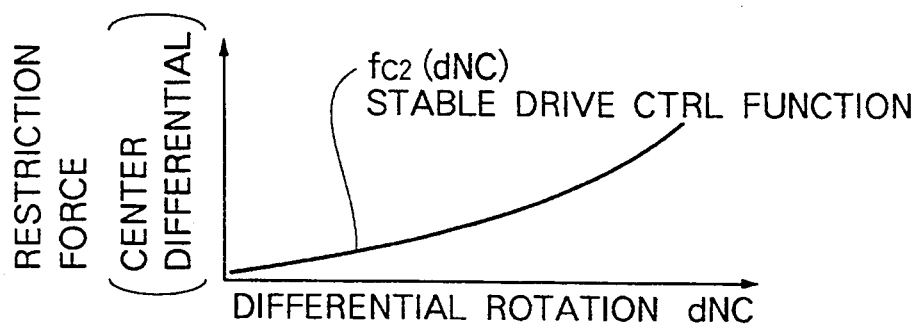
FIG. 10 is a graphical representation between a relationship between the differential rotation speed of the center differential and the restriction force for directing an driving stability.

The control function fc1(dNC) takes a value as shown in FIG. 9. That is, as the differential rotation dNC is increased in an area where the differential rotation dNC is relatively small, the restriction force FC is relatively quickly increased. Thereafter, even if the differential rotation dNC is increased, the increment of the restriction force FC is not so great as that for a small value of the differential rotation dNC. The control function fc2(dNC) for weighing on the driving stability is of a characteristic shown in FIG. 10. The restriction force fc2(dNC) is substantially proportional to the differential rotation dNC. Then, the increment of the restriction force FC is reduced as the differential rotation dNC is increased. In an area where the differential rotation dNC is relatively large, the increment of the restriction force FC is increased as the differential rotation dNC is increased.

The procedures for determining the values of restriction forces FF and FR for the front and rear differentials 19 and 20 are the same as that of the restriction force FC for the center differential 12. Thus, the detailed explanation therefor is omitted. It should, however, be noted that characteristics of the weight functions kf1(dNF), kf2(dNF) (dNF:differential rotation of the front differential 19) and kr1(dNR), kr2(dNR) (dNR:differential rotation of the rear differential 20), yaw rate compensation functions hf1(d$\phi$) and hf2(d$\phi$) for the front differential 19 and yaw rate compensation functions hr1(d$\phi$), hr2(d$\phi$) for the rear differential 20 are different from those of the center differential 12 respectively.

Figure 11:
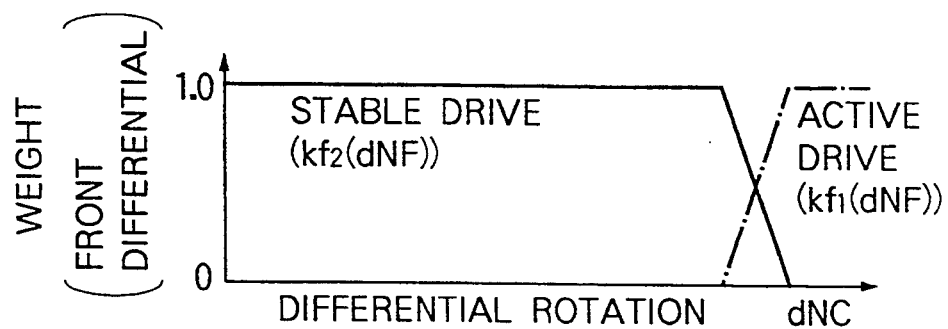
FIG. 11 is a graphical representation showing a relationship between a differential rotation speed of the front differential and a weight coefficient of the restriction force.
Figure 12:
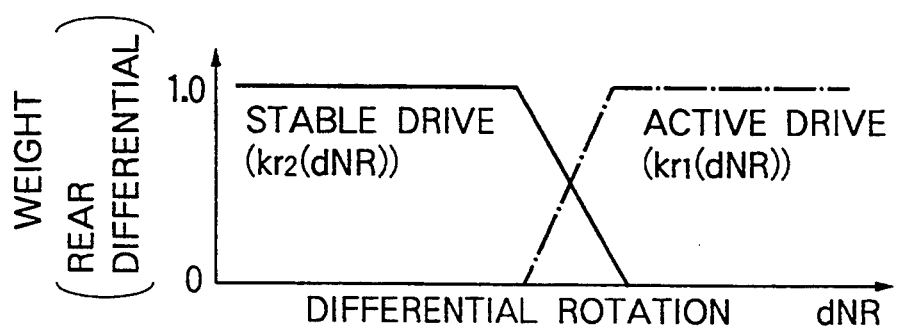
FIG. 12 is a graphical representation showing a relationship between a differential rotation speed of the rear differential and a weight coefficient of the restriction force.

For example, the weight functions kf1(dNF) and kf2(dNF) for the front differential 19 are of characteristics shown as FIG. 11. The weight functions kr1(dNR) and kr2(dNR) for the rear differential 20 are of characteristics shown as FIG. 12. The weight function kf1 of the front differential 19 for weighing on the active drivability takes a value of substantially 0 until the differential rotation dNF increases beyond a predetermined value. Thereafter, the value of the weight function kf1 increases abruptly as the differential rotation dNF is increased. Then, the weight function kf1 keeps the value of substantial 1 irrespective of the increase of the differential rotation dNF. On the other hand, the weight function kf2(dNF) takes a value of substantially 1 until the differential rotation dNF reaches the predetermined value and reduces abruptly to a value of substantial 0 as the differential rotation dNF is increased. Thereafter, the function kf2(dNF) keeps the value of substantial 0 irrespective of the increase of the differential rotation dNF. In other words, the front differential 19 is controlled to weigh on the driving stability compared with the rear differential 20 and the center differential 12 until the differential rotation dNF reaches the predetermined value. As the differential rotation dN is increased, the controls of the center differential 12, the front differential 19 and the rear differential 19 are shifted in this order to weigh on the active drivability to the driving stability. Thus, the center differential 12 has the greatest differential rotation dN, at which the value of the weight is changed so as to weigh on the active drivability rather than the driving stability.

On the other hand, as the differential rotation dN is increased, the weight for improving the active drivability is provided in the order of the center differential 12, rear differential 19 and the front differential 20.

Figure 13:
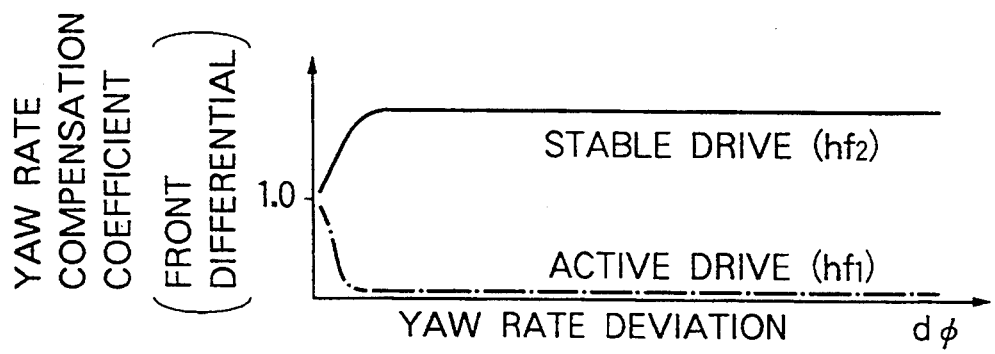
FIG. 13 is a graphical representation of a relationship between the deviation of the yaw rate in the front differential and the compensation coefficient of the restriction force based on the deviation of the yaw rate.
Figure 14:
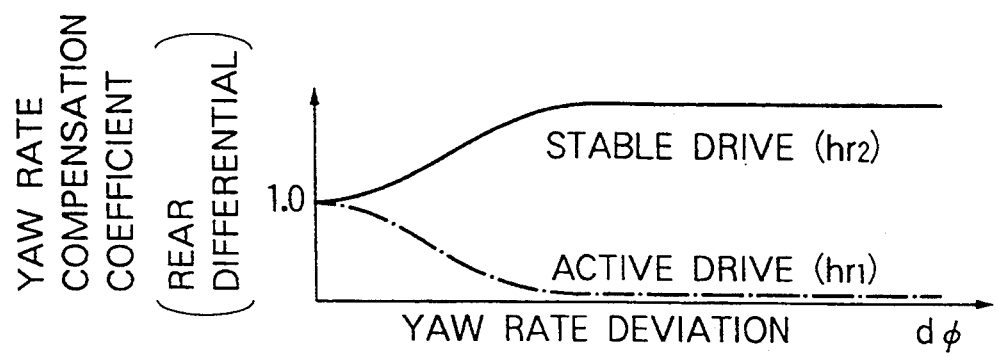
FIG. 14 is a graphical representation of a relationship between the deviation of the yaw rate in the rear differential and the compensation coefficient of the restriction force based on the deviation of the yaw rate.

Characteristics of the yaw rate compensation functions hf1(d$\phi$) and hf2(d$\phi$) and hr1(d$\phi$) and hr2(d$\phi$) are provided for the front and rear differentials 19 and 20 as shown in FIGS. 13 and 14. Compared with the characteristics of the differentials 12, 19 and 20, as differential rotation dN is increased, the center differential 12 makes the slowest change among the three differentials 12, 19 and 20. The front differential 19 makes the quickest change in the yaw rate compensation function. The rear differential 20 has an intermediate characteristic of the three. In other words, the characteristics of the yaw rate compensation functions hf1(d$\phi$) and hf2(d$\phi$) are clearly distinguished from each other where the value of the yaw rate difference d$\phi$ is relatively small. This means that the control for improving the active drivability is distinguished from that for improving the driving stability in setting the value of the yaw rate compensations where the differential rotation dN is relatively small. The characteristics of the yaw rate compensation functions hr1(dNR) and hr2(dNR) are distinguished from each other where the differential rotation dNR is relatively small. But, the characteristics of the rear differential 20 are not so remarkable as those of the front differential 19.

Prior to determination of final restriction forces FC, FF and FR for restricting the differential action, the restriction forces FC, FF and FR are compensated based on the yaw rate. Taking reference with FIG. 5, hereinafter is described a procedure of calculating the final yaw rate compensation for the restriction forces FC, FF and FR based on the yaw rate difference d$\phi$ between the target yaw rate $\phi_T$ and the actual yaw rate $\phi_R$.

The control unit 22 receives the vehicle speed V, actual yaw rate $\phi_R$, steering angle $\theta$, differential rotation of the front differential dNF, differential rotation of the center differential dNC and differential rotation of the rear difference dNR (step P1).

Figure 15:
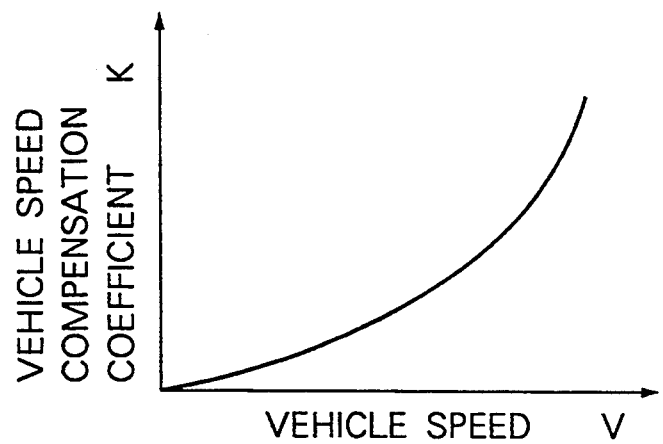
FIG. 15 is a graphical representation of a relationship between a vehicle speed and a compensation coefficient of a target yaw rate of the vehicle.
Figure 16:
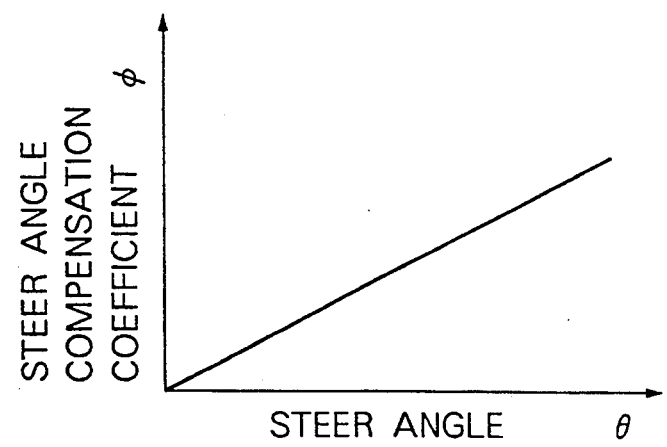
FIG. 16 is a graphical representation of a relationship between a steering angle and compensation coefficient of a target yaw rate of the vehicle.
Figure 17:
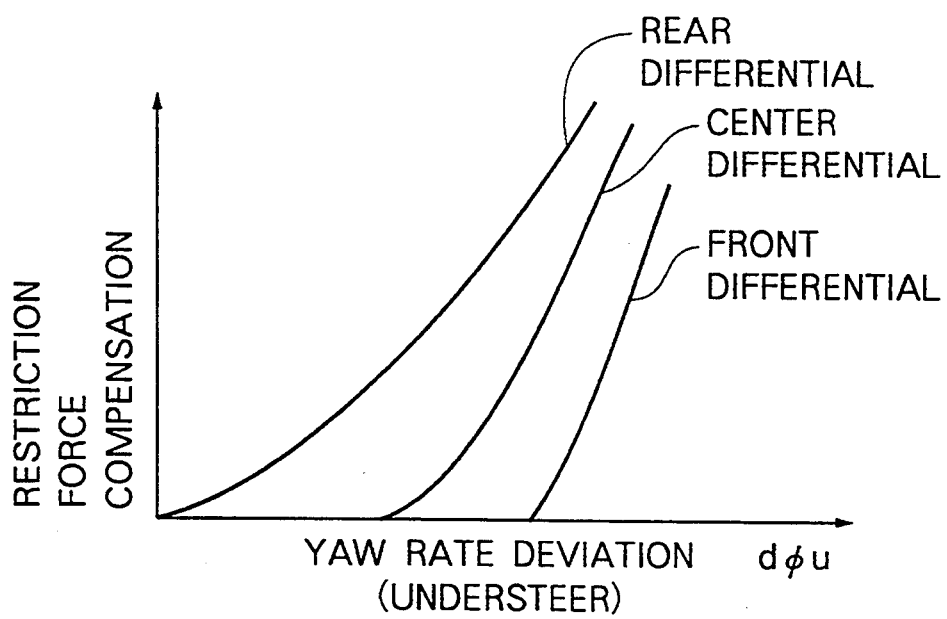
FIG. 17 is a graphical representation of a relationship between the deviation of the yaw rate and the compensation for the restriction force in a vehicle of an understeer tendency.
Figure 18:
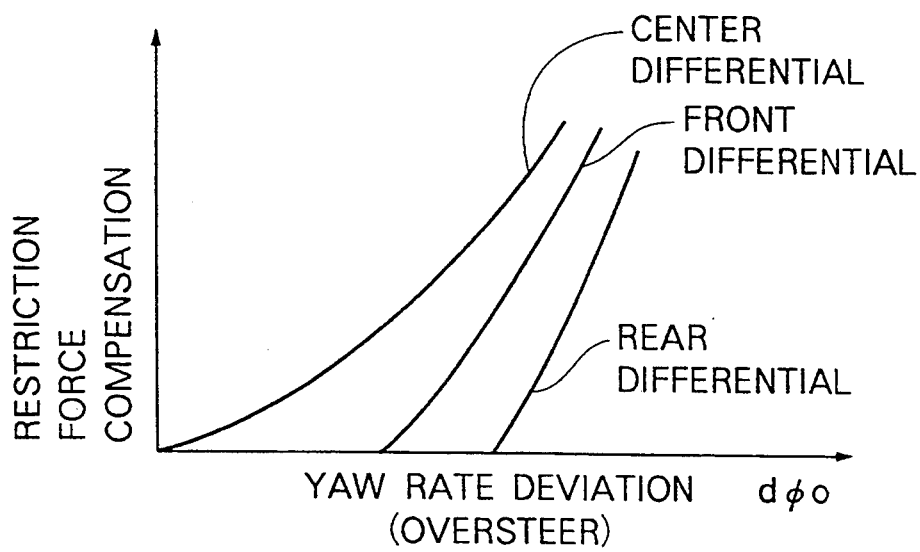
FIG. 18 is a graphical representation of a relationship between the deviation of the yaw rate and the compensation for the restriction force in a vehicle of an oversteer tendency.

Control unit 22, next, calculates the target yaw rate $\phi_T$ (step P2). The target yaw rate $\phi_T$ is expressed as follows:

$$\phi_T = K^* \phi_S$$

Wherein K is a vehicle speed compensation coefficient which is exponentially increased as the vehicle speed is increased as shown in FIG. 15, and $\phi_S$ is a steering angle compensation coefficient which is substantially proportionally increased as the steering angle is increased as shown in FIG. 16.

Then, the control unit 22 compares the target yaw rate $\phi_T$ with the actual yaw rate $\phi_R$ (step P3). If the target yaw rate $\phi_T$ is substantially the same as the actual yaw rate $\phi_R$, the control unit 22 continues the differential action control without changing the restriction forces FC, FF and FR for the center, front and rear differentials 12, 19 and 20. If the target yaw rate $\phi_T$ is greater than the actual yaw rate $\phi_R$, in other words, if the vehicle is of an understeer tendency, the control unit 22 compensates the restriction forces FF, FC and FR based on the yaw rate difference d$\phi_U$ (steps P4, P5 and P6). As the yaw rate differences d$\phi_U$ is increased, the control unit 22 controls the clutch 50 to increase the restriction forces FR, FC and FF for the rear, center and front differentials 20, 12 and 19 in this order. As a result, the resistance force of the rear wheels against the side force is reduced so that the vehicle is controlled toward an oversteer characteristic. Further, the restriction force of the front differential is relatively low. Thus, the front wheels are resistant to the side force to have an improved turning ability.

On the other hand, if the actual yaw rate $\phi_R$ is greater than the target yaw rate $\phi_T$, the control unit 22 further judges whether or not the yaw rate difference d$_{100}$ $_O$ is greater than a predetermined value (steps P7 and P8). If the difference d$\phi_O$ is greater than the predetermined value, the control unit 22 prohibits the differential actions of the differentials 19, 12, 20. In this case, the control unit does not change the restriction forces FF, FC and FR. Consequently, the vehicle is kept from deteriorating the driving stability.

In this judgment, if the difference d$\phi_O$ is smaller than the predetermined value, in other words, if the oversteer tendency is not remarkable, the control unit 22 increases the restriction forces FC, FF and FR of the center, front and rear differentials 12, 19 and 20 in this order as the difference $d\phi_O$ is increased (step P10). In this control, as the restriction force FC of the center differential 12 is reduced, a driving force difference between the front and rear wheels are equalized to produce a tight corner braking tendency and thus facilitate the understeer tendency. In addition, as the restriction force FF of the front differential 20 is increased, the steering characteristic of the vehicle is further modified for the understeer tendency. This is because the resistance of the front wheels against the side force is reduced. In the next step, the restriction force FR is increased so that the vehicle can accomplish an improved straight running performance as well as the modification for the understeer characteristic.

The compensation based on the yaw rate is determined in accordance with the aforementioned procedure. Then, the control unit 22 calculates the final restriction forces FF, FC and FR of the front, center and rear differentials 19, 12 and 20 (step P11).

Alternatively, if the yaw rate difference $d\phi_O$ is increased beyond the predetermined value, the control unit 22 may release only the front differential 19 by providing the control current with a value 0. Consequently, the operability of the vehicle can be improved to get out of an urgent running condition.

Hereinafter, there is described another embodiment of the present invention. The description is made only for the rear differential 20 and omitted for the rest of the differentials 12 and 19 since the procedure for obtaining the restriction force of the differential action are common to the rest of the differentials.

Figure 19:
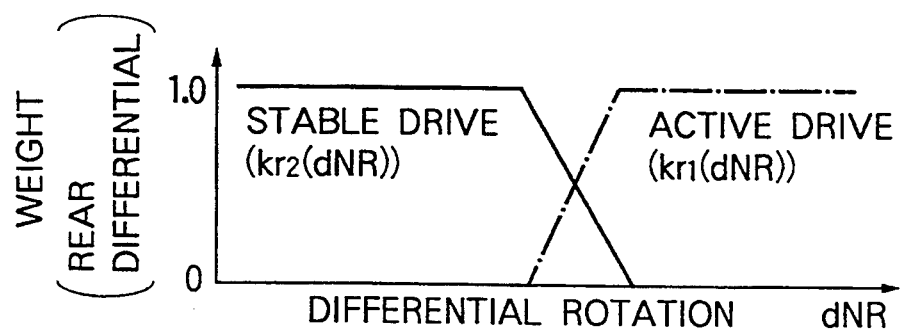
FIG. 19 is a graphical representation showing a relationship between a differential rotation speed of the rear differential and a weight coefficient of the restriction force.

The control unit 22 calculates a weight KR1=kr1(dNR) based on a weight function kr1(dNR) for improving an active drivability in which the vehicle can get a greater operability specifically in a turning action and based on a weight function kr2(dNR) for improving a driving stability (similar to step T1 in FIG. 4). The value of the weight is changed from 0.0 to 1.0 as shown in FIG. 19 as the differential rotation dNR of the center differential 20 is changed. In FIG. 19, as the differential rotation speed dNR is increased beyond a predetermined value, the value of the weight function kr1(dNR) is increased beyond changed from 0 to 1. On the contrary, the weight kr2(dNR) takes a value of about 1 when the differential rotation dNR is less than a predetermined value. Then, the value of the weight function kr2(dNR) is changed from about 1 to 0 as shown in FIG. 19. The value of the weight function is set based on the following. That is, where the restriction force FR is reduced, the active drivability can be improved. On the other hand, where the restriction force FR is increased for restricting the differential action, the driving stability is improved.

In the illustrated embodiment, the control unit 22 calculates a distribution ratio S of the driving force produced by the engine to the rear differential 20 transmitted from the center differential 12. The control unit 22 determines compensations HR1, HR2 for compensating the restriction force FR of the differential action of the rear differential 20 taking account of the distribution ratio according to a similar procedure to the step T2 in FIG. 4. The compensations HR1 and HR2 are determined based on distribution ratio compensation function hr1(S) for weighing on the active drivability and distribution ratio compensation function hr2(S) for weighing on the driving stability respectively. That is, HR1=hr1(S) and HR2=hr2(S).

Figure 20:
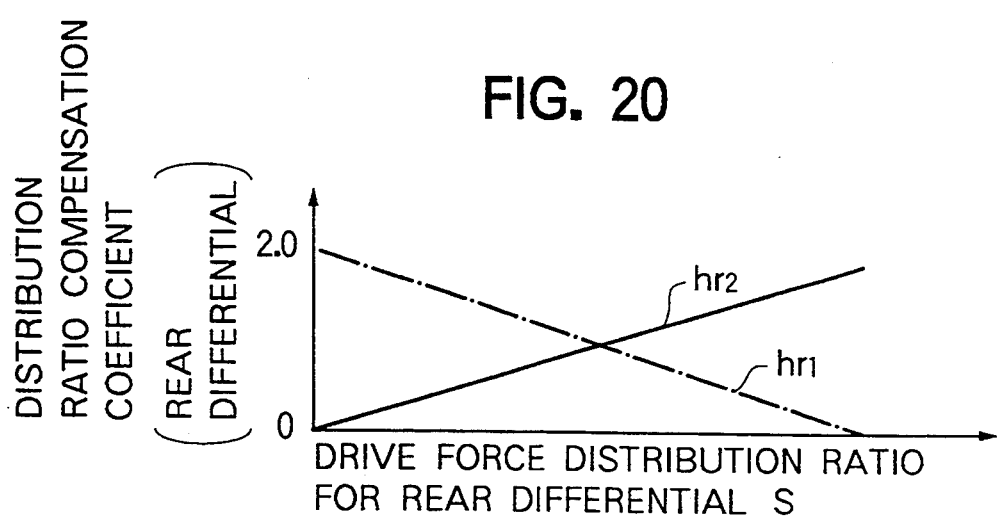
FIG. 20 is a graphical representation showing a relationship between a distribution ratio of a driving force for the rear differential and a compensation coefficient of the restriction force.

In the illustrated embodiment, the distribution ratio functions hr1(S) and hr2(S) are provided with characteristics as shown in FIG. 20 respectively. In FIG. 20, as the distribution ratio to the rear differential 20 is increased, the value of the distribution ratio compensation function hr1(S) is gradually reduced from the value 2. On the contrary, the value of the distribution compensation function hr2(S) is gradually increased from the value 0. The restriction force FR for the rear differential 20 is increased to restrict the differential action between the right and left rear wheels so that the driving stability of the vehicle is improved. On the other hand, the restriction force FR for the rear differential 20 is reduced to facilitate the differential action between the right and left rear wheels to thereby suppress the slip of the wheels.

Next, the control unit 22 renews the values of the weight KR1 and KR2 (similar to step T3 in FIG. 4) taking account of the compensations HR1 and HR2. The restriction force FR of the differential action is provided based on a function of the differential rotation dNR. For this purpose, there are provided a control function fr1(dNR) for weighing on the active drivability and a control function fr2(dNR) for weighing on the driving stability. The values of the restriction force FR is calculated based on the values of the functions fr1 and fr2 by taking account of the weight KR1 and KR2. That is, the restriction force FR is provided as follows;
FR={KR1*fr1(dNR)+KR2*fr2(dNR)}/(KR1+KR2) (similar to the step T4 in FIG. 4).

Figure 21:
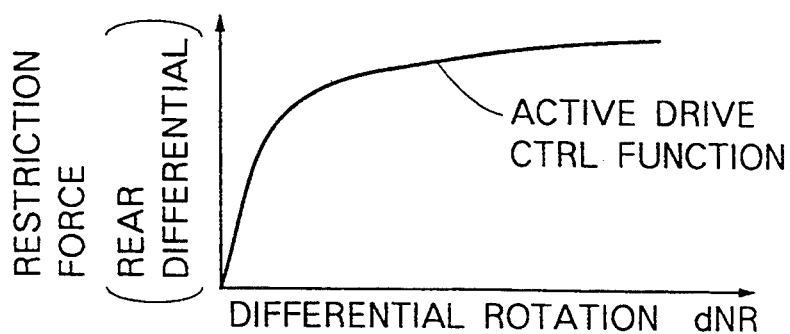
Figure 22:
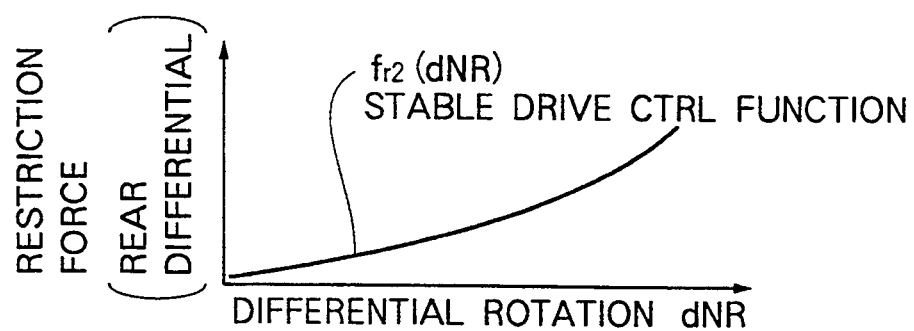
FIG. 22 is a graphical representation between a relationship between the differential rotation speed of the rear differential and the restriction force for directing a driving stability.

The control function fr1(dNR) takes a value as shown in FIG. 21. That is, as the differential rotation dNR is increased in an area where the differential rotation dNR is relatively small, the restriction force FR is relatively quickly increased. Thereafter, even if the differential rotation dNR is increased, the increment of the restriction force FR is not so great as that for a small value of the differential rotation dNR. The control function fr2(dNR) for weighing on the driving stability is of a characteristic shown in FIG. 22. The restriction force fr2(dNR) is substantially proportional to the differential rotation dNR. Then, the increment of the restriction force FR is reduced as the differential rotation dNR is increased. In an area where the differential rotation dNR is relatively large, the increment of the restriction force FR is increased as the differential rotation dNR is increased.

The procedures for determining the values of restriction forces FC and FF for the center and front differentials 12 and 19 are the same as that of the restriction force FR for the rear differential 20. Thus, the detailed explanation therefor is omitted.

Figure 23:
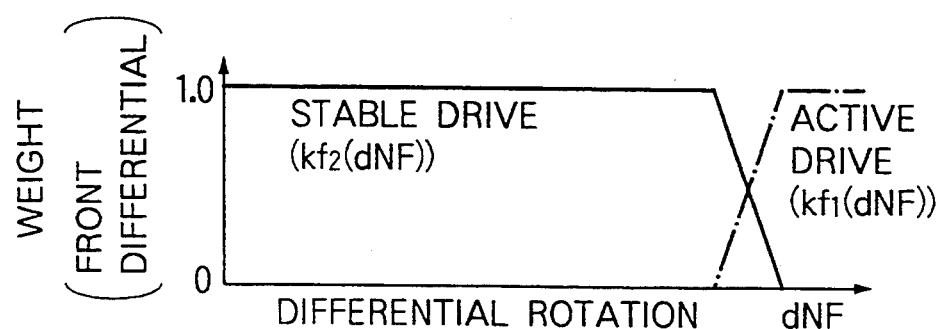
FIG. 23 is a graphical representation showing a relationship between a differential rotation speed of the front differential and a weight coefficient of the restriction force.

For example, the weight functions kf1(dNF) and kf2(dNF) for the front differential 19 are of characteristics shown as FIG. 23 as similar to the characteristics shown in FIG. 11 in the former embodiment. The weight function kf1 of the front differential 19 for weighing on the active drivability takes a value of substantially 0 until the differential rotation dNF increases beyond a predetermined value. Thereafter, the value of the weight function kf1 increases abruptly as the differential rotation dNF is increased. Then, the weight function kf1 keeps the value of substantially 1 irrespective of the increase of the differential rotation dNF. On the other hand, the weight function kf2(dNF) takes a value of substantially 1 until the differential rotation dNF reaches the predetermined value and reduces abruptly to a value of substantial 0 as the differential rotation dNF is increased. Thereafter, the function kf2(dNF) keeps the value of substantial 0 irrespective of the increase of the differential rotation dNF. The front differential 19 is controlled to weigh on the driving stability compared with the rear differential 20 until the differential rotation dNF reaches the predetermined value. Namely, as the differential rotation dN is increased, the front differential 19 is not switched to weigh on the driving stability until the differential rotation dN takes a larger value compared with the rear differential 20.

In this embodiment, as the restriction force FC of the center differential 12 is increased, the distribution ratio S of the driving force to the rear differential is reduced. Usually, the driving force distribution ratio S of the rear differential 20 relative to the front differential 19 in the center differential 12 is changed from approximately 60:40 to 50:50. If the distribution ratio S is provided as 40:60, the restriction force FC of the center differential 12 is reduced.

Figure 24:
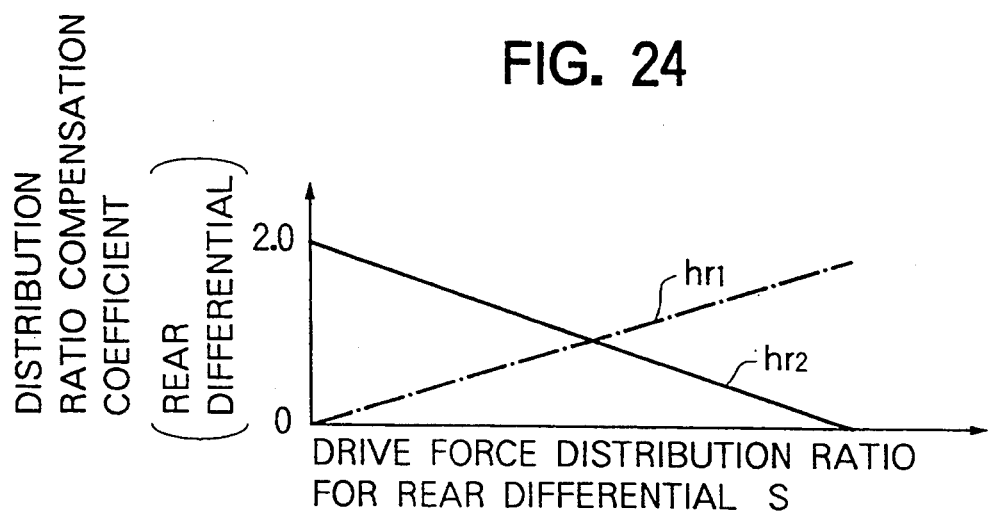
FIG. 24 is a graphical representation showing a relationship between a distribution ratio of a driving force for the rear differential and a compensation coefficient of the restriction force in accordance with another embodiment of the present invention.

Alternatively, the distribution ratio compensation functions hr1(S) and hr2(S) can be set as shown in FIG. 24. In this embodiment, the value of the functions are changed differently from the characteristics shown in FIG. 20. That is, as the distribution ratio to the rear differential 20 is increased, the value of the distribution ratio compensation function hr1(S) is gradually increased from the value 0. On the contrary, the value of the distribution compensation function hr2(S) is gradually reduced from the value 2. The characteristics of the functions hr1(S) and hr2(S) in FIG. 24 are reversed from those shown in FIG. 20. Thus, a running characteristic of the vehicle different from the former embodiment of FIG. 20 can be obtained. In this embodiment, the restriction force FC of the center differential 12 is obtained through the same procedure as the former embodiment as aforementioned.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A differential action control device for a vehicle having axles and wheels comprising:
   an inter-axle differential disposed between the axles for making a differential action between the axles,
   an inter-wheel differential disposed between the wheels for making a differential action between the wheels,
   at least one sensor for detecting a vehicle running condition,
   at least one control unit for (1determining a predetermined parameter based on the vehicle running condition detected and (2) setting a target yaw rate of the vehicle based on the parameter,
   yaw rate detecting means for detecting an actual yaw rate of the vehicle while running, and
   differential control means for controlling a differential action of the inter-axle differential and the interwheel differential based on a deviation between the actual yaw rate and the target yaw rate of the vehicle.

2. A differential action control device as recited in claim 1 wherein the differential control means increases a differential restriction force for restricting the differential action of the inter-axle differential as compared to the inter-wheel differential when the target yaw rate is smaller than the actual yaw rate.

3. A differential action control device as recited in claim 1 wherein the wheels of the vehicle include front wheels and rear wheels and the inter-wheel differential comprises a front differential disposed between said front wheels and a rear differential disposed between said rear wheels, the differential control means increasing a differential restriction force of the rear differential as compared with other differentials of the vehicle when the target yaw rate is greater than the actual yaw rate.

4. A differential action control device as recited in claim 1 wherein the wheels of the vehicle include front wheels and rear wheels and the inter-wheel differential comprises a front differential disposed between said front wheels and a rear differential disposed between said rear wheels, the differential control means increasing a differential restriction force of the inter-axle differential compared with the front differential and the rear differential when the target yaw rate is smaller than the actual yaw rate.

5. A differential action control device as recited in claim 1 wherein the wheels of the vehicle include front wheels and rear wheels and the inter-wheel differential comprises a front differential disposed between said front wheels and a rear differential disposed between said rear wheels, the differential control means increasing a differential restriction force of the rear differential as compared with the front differential and increasing a differential restriction force of the inter-axle differential as compared with the front differential when the target yaw rate is greater than the actual yaw rate.

6. A differential action control device as recited in claim 1 wherein the differential control means stops controlling the differential action to prevent a differential restriction force from changing when the actual yaw rate is far greater than the target yaw rate.

7. A differential action control device as recited in claim 3 wherein the differential control means reduces a differential restriction force of the front differential when the actual yaw rate is far greater than the target yaw rate.

8. A differential action control device as recited in claim 1 wherein the target yaw rate is based at least on a steering wheel angle.

* * * * *